(12) United States Patent
Wang et al.

(10) Patent No.: US 6,494,374 B1
(45) Date of Patent: Dec. 17, 2002

(54) SCANNER WHICH CAN SCAN TRANSPARENT AND REFLECTIVE DOCUMENTS WITH ONLY ONE LIGHT SOURCE

(75) Inventors: Ping-Chih Wang, Yun-Lin Hsien (TW); Lin-Ta Tseng, Hsin-Chu Hsien (TW)

(73) Assignee: Mustek Systems Inc., Hsin-Chu (TW)

( * ) Notice: Subject to any disclaimer, the term of this patent is extended or adjusted under 35 U.S.C. 154(b) by 218 days.

(21) Appl. No.: 09/693,871

(22) Filed: Oct. 23, 2000

(51) Int. Cl.[7] ............................................. G06K 7/10
(52) U.S. Cl. ............................................... 235/459
(58) Field of Search ................... 235/459, 461, 235/462, 212

(56) References Cited

U.S. PATENT DOCUMENTS

| | | | | |
|---|---|---|---|---|
| 5,606,450 A | * | 2/1997 | Chen | 250/234 |
| 5,760,412 A | * | 6/1998 | Yang et al. | 250/234 |
| 6,185,011 B1 | * | 2/2001 | William | 358/474 |
| 6,400,484 B1 | * | 6/2002 | Wang et al. | 358/474 |

* cited by examiner

*Primary Examiner*—Michael G. Lee
*Assistant Examiner*—Kim Nguyen
(74) *Attorney, Agent, or Firm*—Winston Hsu

(57) ABSTRACT

A scanner has a casing with a transparent surface, a scanning module, a reflecting surface module, a driving device and a control circuit. The scanning module is moveably installed inside the casing under the transparent surface, and is used to scan the document and produce corresponding scanning signals. The scanning module has a light source installed under the transparent surface to illuminate the document, an image sensing module to scan images from the document and produce the corresponding scanning signals, and a reflective module to reflect the images from the document to the image sensing module. The reflecting surface module is moveably installed above the transparent surface, and is used to reflect light from the light source down to the transparent surface. The driving device is installed inside the casing to move the scanning module. The control circuit controls the operations of the scanner. The reflecting surface module moves synchronously along a predetermined direction following the scanning module to scan the document on the transparent platform. The light emitted from the light source is used to scan both transparent and reflective documents.

8 Claims, 8 Drawing Sheets

SCANNER WHICH CAN SCAN TRANSPARENT AND REFLECTIVE DOCUMENTS WITH ONLY ONE LIGHT SOURCE

BACKGROUND OF THE INVENTION

1. Field of Invention

The invention discloses a scanner and, in particular, a scanner installed with a movable reflecting surface module on a transparent platform for scanning both transparent and reflective documents.

2. Description of the Prior Art

Please refer to FIG. 1 and FIG. 2. FIG. 1 is a perspective view of a conventional scanner 10. FIG. 2 is a functional block diagram of the scanner 10. The scanner 10 comprises a casing 12 with a transparent platform 14 onto which is placed a document to be scanned, a scanning module 16, a driving device 18 installed inside the casing 12 for moving the scanning module 16, and a control circuit 20 installed inside the casing 12 for controlling operations of the scanner 10.

The scanning module 16 is movably installed underneath the transparent platform 14 and comprises a light source 22 for illuminating the document on the transparent platform 14, an image sensing module 24 to scan images from the document on the transparent platform 14 to produce corresponding scanning signals, and a reflector module 28 to reflect light from the document to the image sensing module 24. The scanner 10 further comprises a reflecting surface module 26 installed on the transparent platform 14 to reflect light emitted from the light source 22 down to the transparent platform 14.

Please refer to FIG. 3, which is a cross-sectional view of the scanner 10 in FIG. 1 along line 3—3. The reflecting surface module 26 includes a first reflector 23 and a second reflector 25, both being installed on either side of the upper portion of the light source 22. The first reflector 23 reflects light emitted upwardly from the right side of the light source 22 horizontally to the second reflector 25, which then reflects the light down to the transparent platform 14.

When a user wishes to scan a transparent document 13, the user must place the reflecting surface module 26 on the transparent platform 14 so that the light emitted from the right side of the light source 22 will pass down through the document 13 via the first reflector 23 and the second reflector 25. Reflected by the reflector module 26, the light is sent to the image sensing module 24 to produce corresponding image signals. The reflecting surface module 26 is unremovably installed on the transparent platform 14.

The scanner 10 further comprises an upper cover (not shown). When a user wishes to scan a reflective document, the user can take off the reflecting surface module 26 and put on the upper cover. Light emitted from the light source 22 upwardly will reflect down off the document 13. Through the reflector module 28, the light is then reflected to the image sensing module 24 to produce corresponding image signals.

When the scanner 10 scans a transparent document, the light upwardly emitted from the light source 22 must be reflected by the first reflector 23 and the second reflector 25 to pass downward through the transparent document. The scanning area cannot be larger than the reflecting surface module 26, and is limited by the sizes of the first reflector 23 and the second reflector 25. Larger first and second reflectors 23 and 25 cover more area over the transparent platform 14, permitting larger documents to be scanned.

To increase the scanning area for transparent documents in the scanner 10, the area and height of the reflecting surface module 26 has to be increased correspondingly. As the area of the reflecting surface module 26 gets larger, the document area covered by the reflecting surface module 26 also becomes larger. As the reflecting surface module 26 gets higher, the area for installing the first reflector 23 and the second reflector 26 gets larger. Thus, the scanning area for transparent documents in the scanner 10 becomes larger.

Increasing the area and height of the reflecting surface module 26 increases the volume thereof. This does not only increase the manufacturing cost of the scanner 10 but also makes the use of the scanner 10 inconvenient.

Furthermore, as shown in FIG. 3, since the document 13 and the transparent platform 14 are not totally transparent, when scanning a transparent document the light emitted from the left side of the light source 22 will be partially downwardly reflected and absorbed by the image sensing module 24. The image signal noise is thus increased, lowering the scanning quality.

SUMMARY OF THE INVENTION

It is thus a primary objective of the present invention to provide a scanner with a reflecting surface module movably installed on a transparent platform for solving the aforementioned problems of the prior art.

Briefly, the present invention discloses a scanner with a casing having a transparent surface, a scanning module, a reflecting surface module, a driving device and a control circuit. A document to be scanned is placed on the transparent surface of the casing. The scanning module is moveably installed inside the casing under the transparent surface, and is used to scan the document and produce corresponding scanning signals. The scanning module has a light source installed under the transparent surface to illuminate the document, an image sensing module to scan images from the document and produce the corresponding scanning signals, and a reflective module to reflect the images from the document to the image sensing module. The reflecting surface module is moveably installed above the transparent surface, and is used to reflect light from the light source down to the transparent surface. The driving device is installed inside the casing to move the scanning module. The control circuit controls the operations of the scanner. The reflecting surface module moves synchronously along a predetermined direction following the scanning module to scan the document on the transparent platform. If the document is predominantly transparent, light emitted upwardly from the light source passes through the document, is reflected downward to the transparent platform by the reflecting surface module, and is then reflected by the reflective module to the image sensing module to produce the corresponding scanning signals. If the document is predominantly reflective, then light from the light source is reflected downward from the document to the image sensing module by the reflective module to produce the corresponding scanning signals.

It is an advantage of the present invention that, because the reflecting surface module moves with the scanning module, the scanning area is not limited by the areas of the mirrors in the reflecting surface module. Hence, the size of the reflecting surface module is greatly reduced. Additionally, the present invention helps to reduce the amount of noise caused by unwanted reflected light, thus improving image quality.

DETAILED DESCRIPTION OF THE INVENTION

Figure 1:
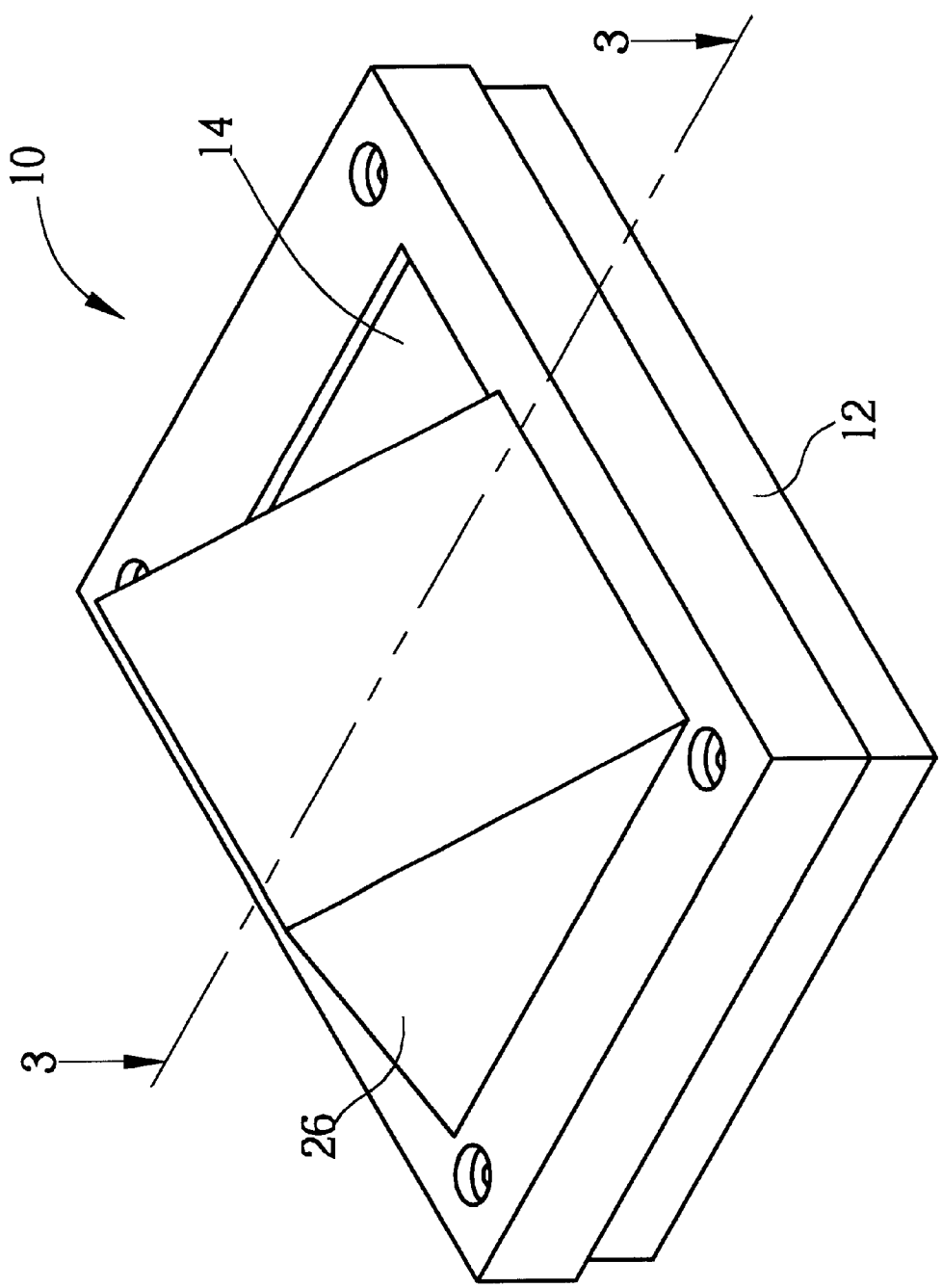
FIG. 1 is a perspective view of a conventional scanner.
Figure 2:
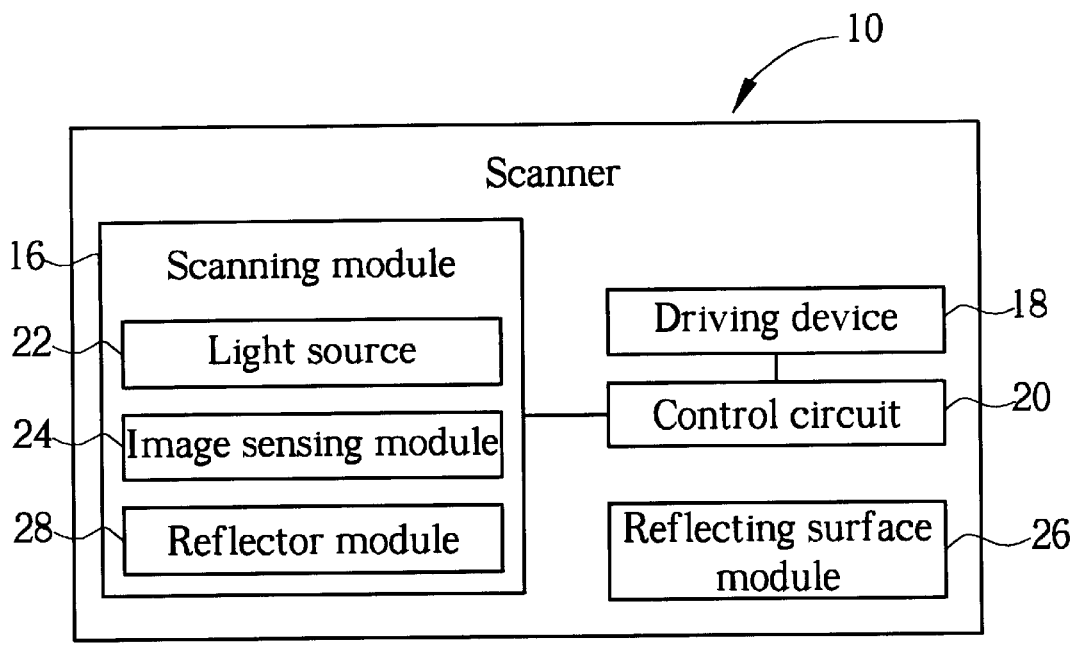
FIG. 2 is a functional block diagram of the scanner in FIG. 1.
Figure 3:
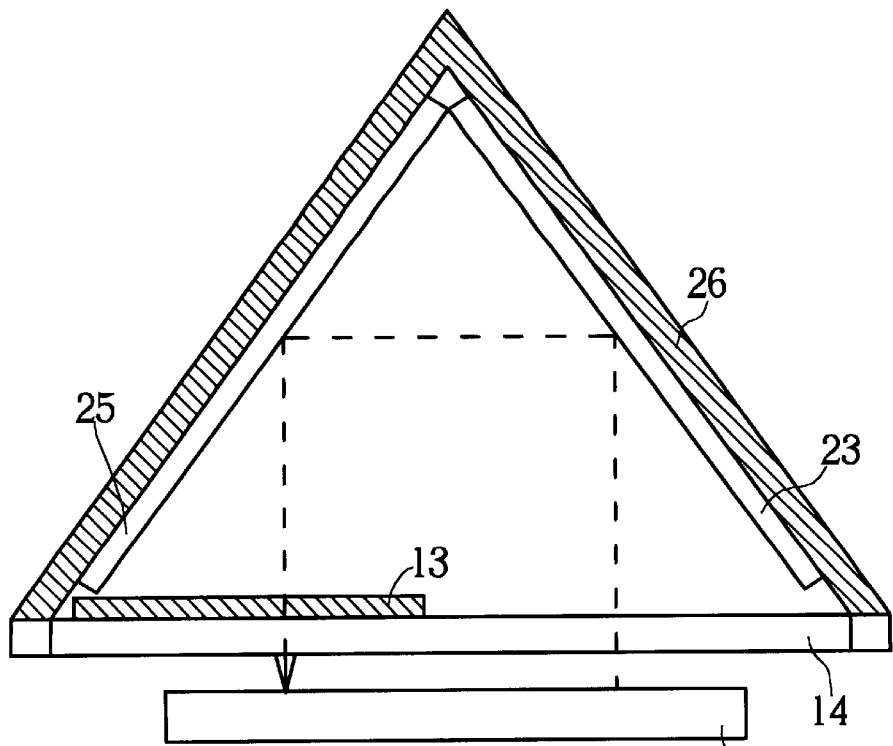
FIG. 3 is a cross-sectional view of the scanner in FIG. 1.
Figure 4:
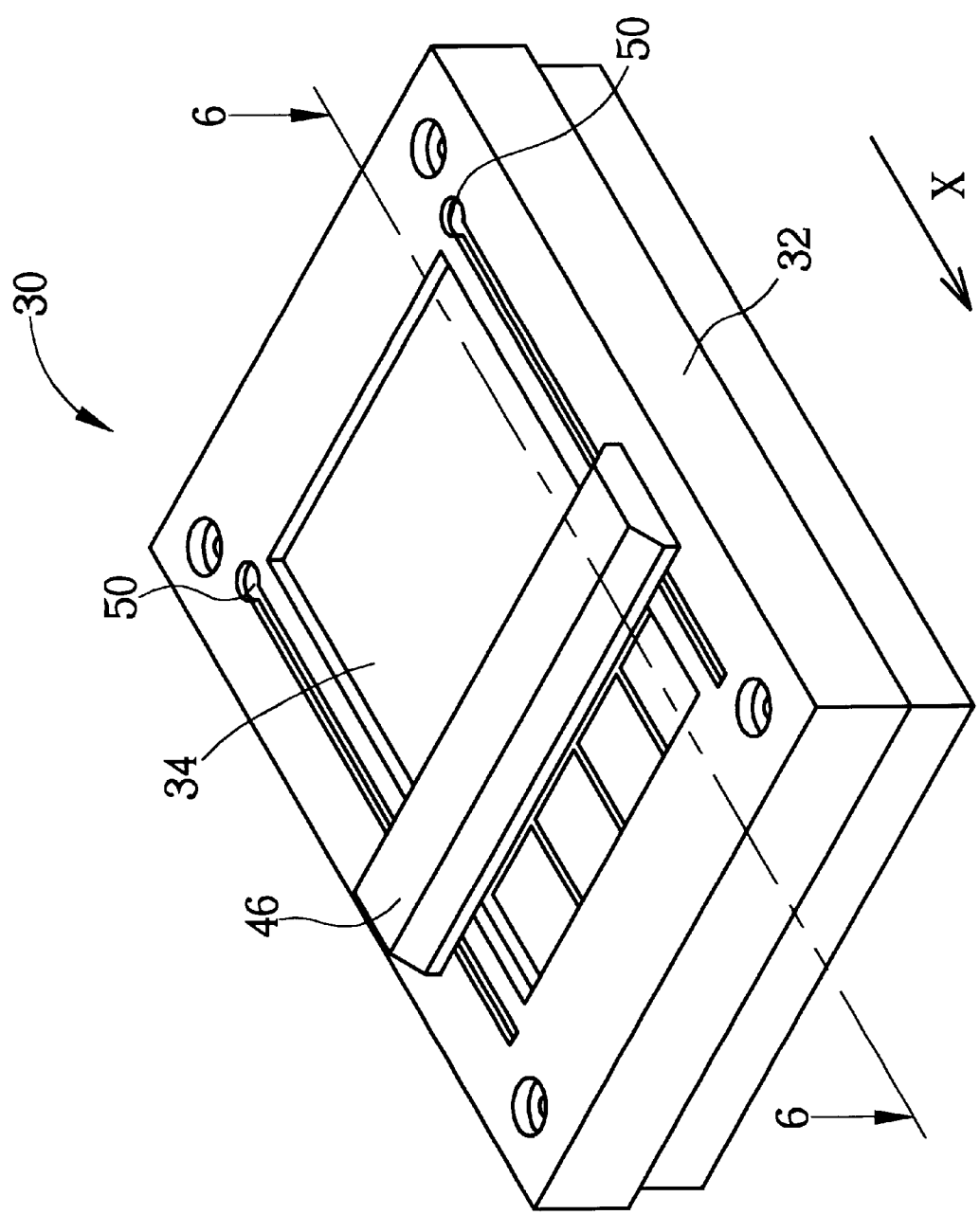
FIG. 4 is a perspective view of a scanner of the present invention.
Figure 5:
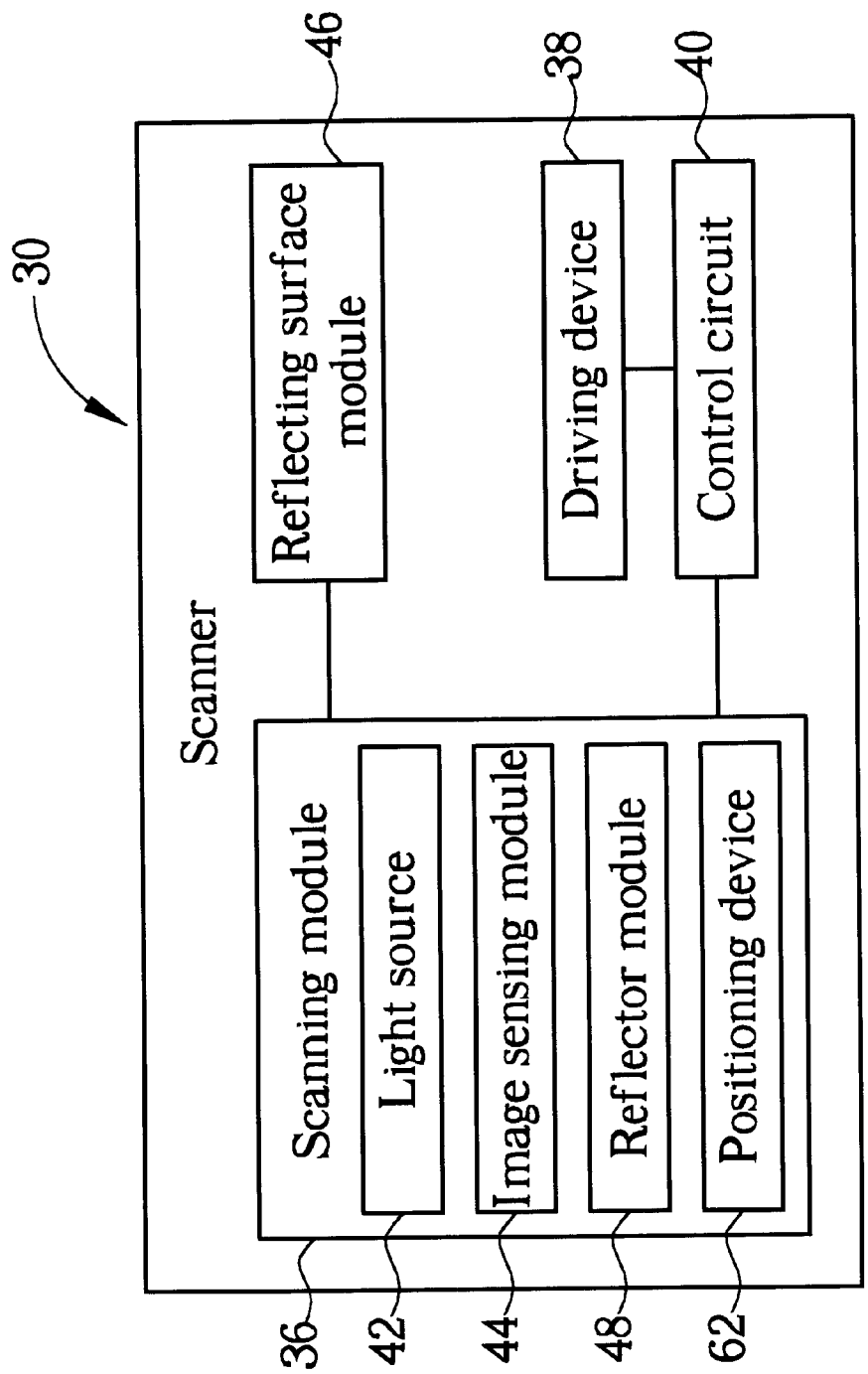
FIG. 5 is a functional block diagram of the scanner in FIG. 4.

Please refer to FIG. 4 and FIG. 5. FIG. 4 is a perspective view of a scanner 30 of the present invention. FIG. 5 is a functional block diagram of the scanner 30. The scanner 30 comprises a casing 32 with a transparent platform 34 onto which is placed a document to be scanned, a scanning module 36 movably installed under the transparent platform 34, a driving device 38 installed inside the casing 32 to move the scanning module 36, and a control circuit 40 installed inside the casing 32 to control operations of the scanner 30.

The casing 32 of the scanner 30 comprises two parallel strip openings 50 located on two opposite sides of the transparent platform 34 along a predetermined direction X. The scanner 30 further comprises a reflecting surface module 46 movably installed over the transparent platform 34 through the two parallel strip openings 50 to reflect light emitted upwardly from the scanning module 36 down to the transparent platform 34. The reflecting surface module 46 moves synchronously with the scanning module 36 along the predetermined direction X to scan a document on the transparent platform 34.

Figure 6:
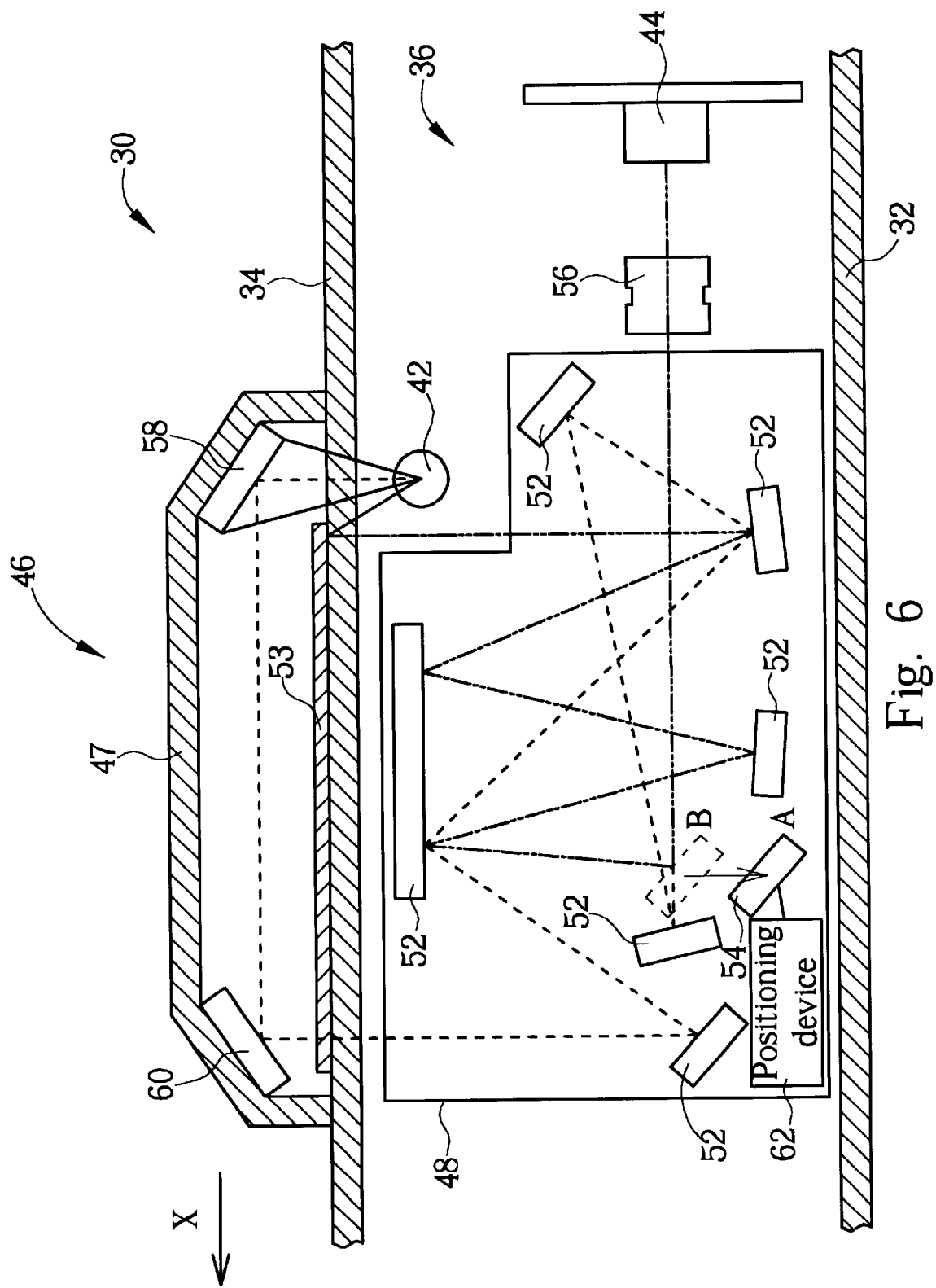
FIG. 6 is a cross-sectional view of the scanner in FIG. 4.

Please refer to FIG. 6, which is a cross-sectional view of the scanner 30 in FIG. 4 along line 6—6. As shown in FIG. 5 and FIG. 6, the scanning module 36 comprises a light source 42 to illuminate a document 53 on the transparent platform 34, an image sensing module 44 for scanning the image from the document 53 to produce corresponding image signals, a reflector module 48 for reflecting the image from the document 53 to the image sensing module 44, and a lens 56 for converging the image from the document 53 onto the image sensing module 44.

As shown in FIG. 6, the reflecting surface module 46 comprises a housing 47, a first reflector 58 above the light source 42 on the right side of the housing 47, and a second reflector 60 on the left side of the housing 47. The first reflector 58 reflects light upwardly emitted from the light source 42 along the predetermined direction X to the second reflector 60, and the second reflector 60 reflects the light from the first reflector 58 downward to the transparent platform 34.

When the document 53 to be scanned is a transparent document, light upwardly emitted from the light source 42 is reflected by the first and second reflectors 58, 60 downward to the document 53 on the transparent platform 34. The light is further reflected to the image sensing module 44 by the reflector module 48 to produce corresponding image signals. Hence, light emitted from the light source 42 can first travel upwardly to pass through the document 53 on the transparent platform 34 and then get reflected by the first and second reflectors 58, 60 back to the transparent platform 34. Or, when the document 53 is reflective, light emitted from the light source 42 is reflected downwardly by the document 53 and then reflected by the reflector module 48 to the image sensing module 44.

As shown in FIG. 6, the reflector module 48 comprises six fixed reflectors 52 and a movable reflector 54 for reflecting the image from the document 53 on the transparent platform to the image sensing module 44. The movable reflector 54 is installed at a first position A or a second position B.

When the document 53 is transparent, the movable reflector 54 is fixed at the first position A. When the document 53 is reflective, the movable reflector 54 is fixed at the second position B for reflecting the image from the document 53 on the transparent platform 34 to the image sensing module 44.

Also shown in the drawing, the optical path of the light emitted from the light source 42 and reflected by the reflector module 48 to the image sensing module 44 will change as the position of the movable reflector 54 changes its position. When the document 53 is transparent, the optical path is shown by the dash line. When the document 53 is reflective, the optical path is shown by the dash-dot-dash line. Such a configuration achieves the objective of scanning both transparent and reflective documents.

The scanning module 36 further comprises a positioning device 62 connecting to the control circuit 40 to fix the movable reflector 54 at the first position A or the second position B, under the control of the control circuit 40. The reflecting surface module 46 attaches to the scanning module 36 in an unremovable manner. The scanner 30 includes a switch (not shown) connected to the control circuit 40. When the user wants to scan a transparent document, he or she uses the switch to control the control circuit 40 to fix the movable reflector 54 at the first position A. When the user wants to scan a reflective document, he or she uses the switch to control the control circuit 40 to fix the movable reflector 54 at the second position B.

The reflecting surface module 46 can be fixed onto the scanning module 36 in a removable way. The scanner 30 further comprises a sensor (not shown) to detect whether the reflecting surface module 46 has been fixed onto the scanning module 36, and an upper cover (not shown). When the user wants to scan a transparent document, he or she must install the reflecting surface module 46 onto the scanning module 36, trigging the sensor so that the control circuit 40 will fix the movable reflector 54 at the first position A. When the user wants to scan a reflective document, he has or she must remove the reflecting surface module 46 and put on the upper cover, and the control circuit 40 will fix the movable reflector 54 at the second position B.

Figure 7:
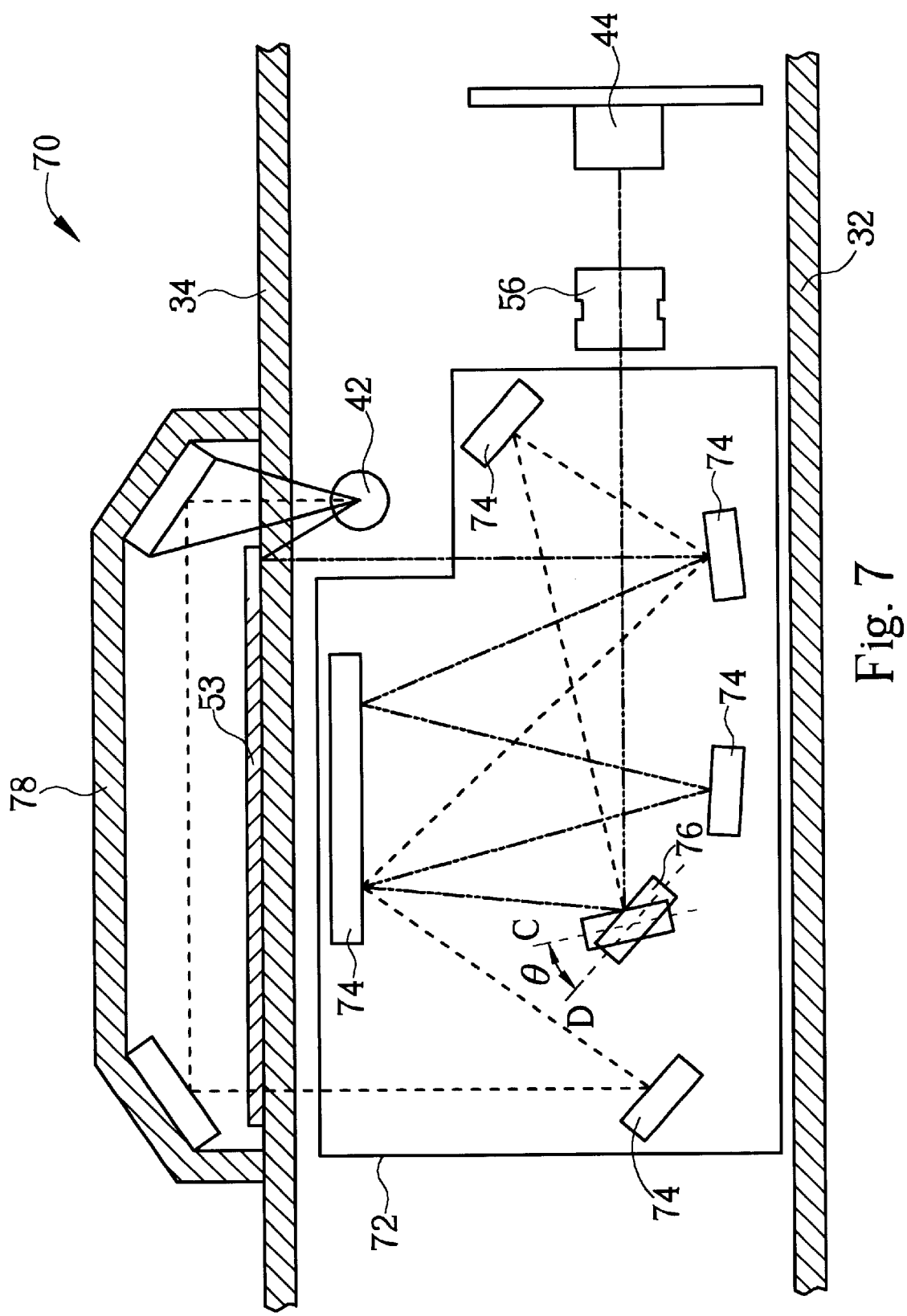
FIG. 7 is a second embodiment scanner of the present invention.

Please refer to FIG. 7, which shows a second embodiment of the present invention. The differences between the scanner 70 and the scanner 30 are in the reflector module 72, the reflecting surface module 78 and the design of the positioning device. The reflector module 72 of the scanner 70 comprises five fixed reflectors 74 and a rotatable reflector 76. The rotatable reflector 76 can be fixed at a first position C or a second position D. The first position C and the second position D differ by a predetermined angle θ.

Figure 8:
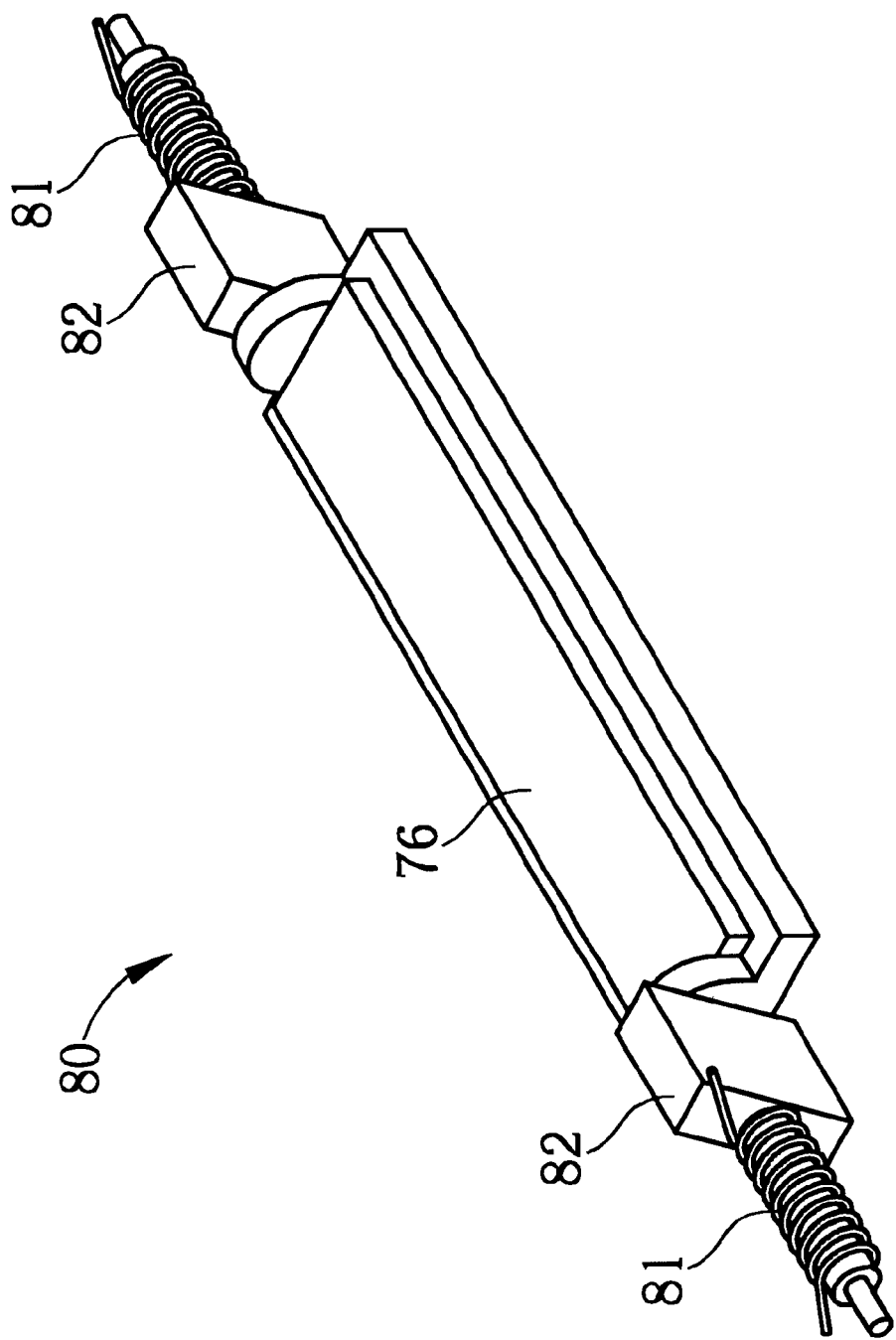
FIG. 8 is a schematic view of the positioning device of the scanner in FIG. 7.
Figure 9:
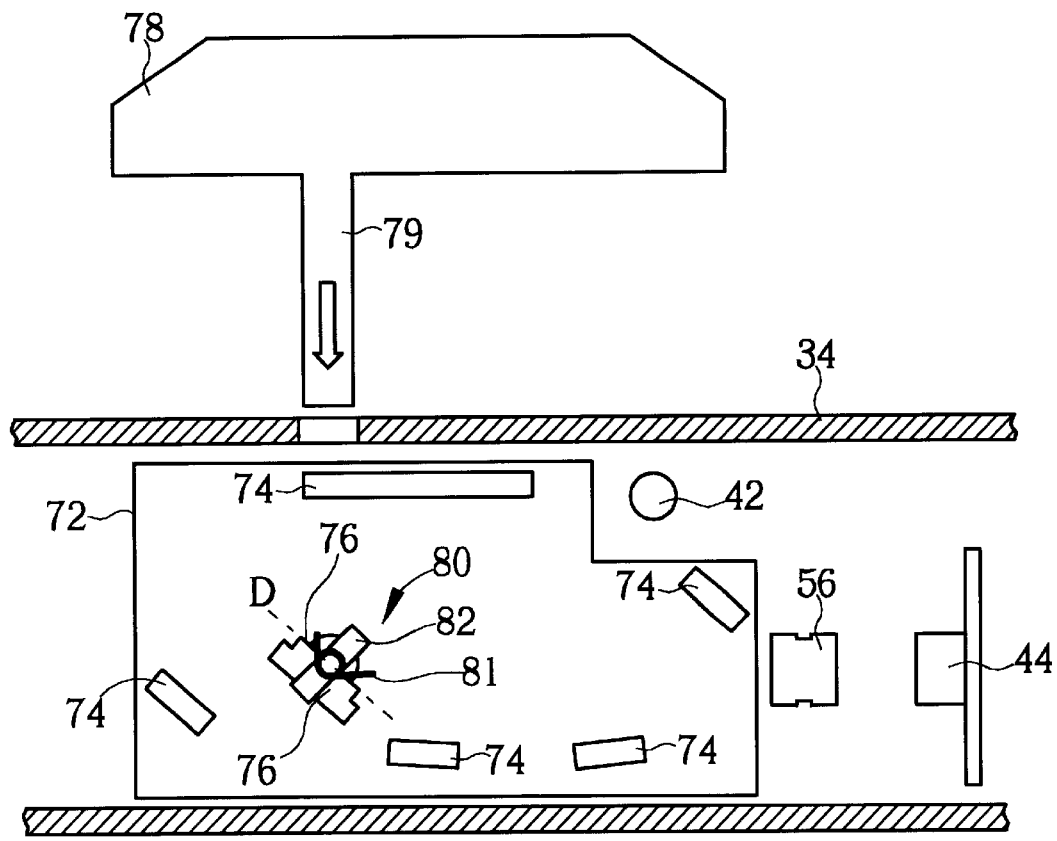
FIG. 9 is a schematic view of the scanner in FIG. 7 with a reflecting surface module not yet installed on a reflector module.
Figure 10:
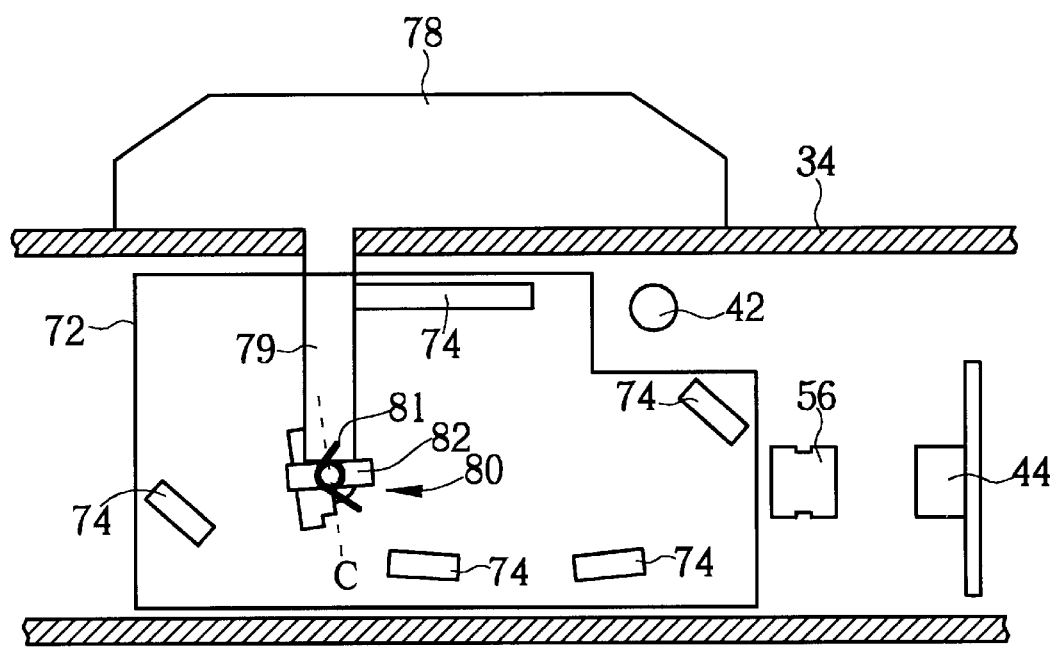
FIG. 10 is a schematic view of the scanner in FIG. 7 with a reflecting surface module installed on a reflector module.

Please refer to FIGS. 8, 9 and 10. FIG. 8 is a schematic view of the positioning device of the scanner in FIG. 7. FIG. 9 is a schematic view of the scanner in FIG. 7 with the reflecting surface module 78 not yet installed on the reflector module 72. FIG. 10 is a schematic view of the scanner in FIG. 7 with the reflecting surface module 78 installed on the reflector module 72. The bottom side of the reflecting surface module 78 has two supporting poles 79 to attach the reflecting surface module 78 to the reflector module 72 through the two parallel strip openings 50. The rotatable reflector 76 is installed on the positioning device 80. The positioning device 80 comprises two supporting planes 82 for supporting the supporting poles 79 of the reflecting surface module 78, and an elastic positioning device 81 for fixing the rotatable reflector 76 at the first or second position C or D.

As shown in FIG. 10, when the user wants to scan a transparent document, he or she must install the reflecting surface module 78 on the reflector module 72. That is, the supporting poles 79 of the reflecting surface module 78 lean against the supporting planes 82 of the positioning device 80 so that the rotatable reflector 76 rotates a predetermined angle θ and is fixed at the first position C.

The scanner 70 comprises an upper cover. When the user wants to scan a reflective document, he or she must remove the reflecting surface module 78 and put on the upper cover. The elastic device 81 will then fix the rotatable reflector 76 at the second position D.

As shown in FIG. 7, the optical path of the light emitted from the light source 42 and reflected by the reflector module 72 to the image sensing module 44 will change as the angle of the rotatable reflector 76 changes. When the document 53 is transparent, the optical path is shown by the dash line. When the document 53 is reflective, the optical path is shown by the dash-dot-dash line.

Compared with the conventional scanner 10, the reflecting surface modules 46, 78 of the disclosed scanners 30, 70, respectively, can be installed on the reflector module 48, 72 through the two parallel strip openings 50. When the scanning module 36 moves, it will drive the reflecting surface modules 46, 78 into motion so that the scanning module 36 and the reflecting surface modules 46, 78 have synchronous motion. The scanning area is therefore not limited by the areas of the first reflector 58 and the second reflector 60. In such a manner, not only are the areas of the first and second reflectors 58, 60 smaller than the first and second reflectors 23, 25 in the conventional scanner 10, the heights of the reflecting surface module 46, 78 are greatly reduced.

Furthermore, since the first and second reflectors 58, 60 of the invention are not installed on both sides of the upper portion of the light source 22 as the conventional first and second reflectors 23, 25 are, there is no such problem of increasing the image signal noise due to downwardly reflected light. The quality of the scanned image by the present invention is thus enhanced.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner comprising:

a casing with a transparent surface onto which is placed a document to be scanned;

a scanning module moveably installed inside the casing under the transparent surface to scan the document on the transparent surface and to produce corresponding scanning signals, the scanning module comprising:
a light source installed under the transparent surface to illuminate the document;
an image sensing module to scan images from the document and produce the corresponding scanning signals; and
a reflective module to reflect the images from the document to the image sensing module;

a reflecting surface module moveably installed above the transparent surface to reflect light from the light source down to the transparent surface;

a driving device installed inside the casing to move the scanning module; and a control circuit to control the operations of the scanner;

wherein the reflecting surface module moves synchronously along a predetermined direction following the scanning module to scan the document on the transparent platform, and if the document is predominantly transparent, upwardly emitted light from the light source passes through the document, is reflected downward to the transparent platform by the reflecting surface module, and is then reflected by the reflective module to the image sensing module to produce the corresponding scanning signals; however, if the document is predominantly reflective, then light from the light source is reflected downward to the image sensing module by the document and is then reflected by the reflective module to the image sensing module to produce the corresponding scanning signals.

2. The scanner of claim 1 wherein the reflecting surface module comprises a housing, a first reflector installed on one side of the housing and located above the light source, and a second reflector installed on another side of the housing; wherein light upwardly emitted from the light source is horizontally reflected by the first reflector to the second reflector, and is then reflected downward by the second reflector to the transparent surface.

3. The scanner of claim 2 wherein the light upwardly emitted from the light source is horizontally reflected along the predetermined direction to the second reflector by the first reflector.

4. The scanner of claim 2 wherein the light upwardly emitted from the light source upwardly passes through the document on the transparent surface and is then reflected back to the transparent surface by the first reflector and the second reflector.

5. The scanner of claim 2 wherein the light upwardly emitted from the light source is reflected by the first reflector and the second reflector to downwardly pass through the document on the transparent surface.

6. The scanner of claim 1 wherein the casing of the scanner comprises two parallel strip openings on two sides of the transparent platform along the predetermined direction, and the bottom side of the reflecting surface module has two supporting poles to attach the reflecting surface module to the housing of the scanning module through the two parallel strip openings.

7. The scanner of claim 6 wherein the two supporting poles are removably attached to the scanning module.

8. The scanner of claim 1 wherein the reflective module comprises a plurality of fixed reflectors and a movable reflector fixed at a first or fixed at a second position; wherein the movable reflector is fixed at the first position if the document is predominantly transparent, or is fixed at the second position to reflect the images to the image sensing module if the document is predominantly reflective.

* * * * *